(12) United States Patent
Kawashima et al.

(10) Patent No.: US 7,319,320 B2
(45) Date of Patent: Jan. 15, 2008

(54) ROTATION ANGLE DETECTING DEVICE

(75) Inventors: Takashi Kawashima, Nagoya (JP); Koichiro Matsumoto, Kariya (JP); Tatsuya Kitanaka, Nagoya (JP); Takao Ban, Toyohashi (JP); Kenji Takeda, Okazaki (JP); Tsutomu Nakamura, Kariya (JP); Osamu Shimomura, Okazaki (JP)

(73) Assignees: Denso Corporation (JP); Nippon Soken, Inc. (JP)

( * ) Notice: Subject to any disclaimer, the term of this patent is extended or adjusted under 35 U.S.C. 154(b) by 190 days.

(21) Appl. No.: 11/168,381

(22) Filed: Jun. 29, 2005

(65) Prior Publication Data
US 2006/0028203 A1     Feb. 9, 2006

(30) Foreign Application Priority Data
Aug. 6, 2004   (JP)   .............................. 2004-231636

(51) Int. Cl.
G01B 7/14     (2006.01)
G01R 33/06    (2006.01)
H01L 43/06    (2006.01)
H01L 43/08    (2006.01)

(52) U.S. Cl. ............................. 324/207.25; 324/207.22

(58) Field of Classification Search ............. 324/207.2, 324/207.21, 207.23, 207.25, 252, 173, 174, 324/179, 207.22; 73/514.31, 514.39
See application file for complete search history.

(56) References Cited

U.S. PATENT DOCUMENTS

| | | | | |
|---|---|---|---|---|
| 3,162,804 A | * | 12/1964 | Parsons | ....................... 323/368 |
| 3,689,836 A | * | 9/1972 | Snyder | .................... 324/117 R |
| 4,670,877 A | * | 6/1987 | Nishibe | ....................... 714/728 |
| 5,124,709 A | * | 6/1992 | Baron et al. | ................ 342/192 |
| 5,602,472 A | * | 2/1997 | Bergstedt et al. | ....... 324/207.25 |
| 7,030,608 B2 | * | 4/2006 | Kawashima et al. | ... 324/207.25 |
| 2005/0030012 A1 | * | 2/2005 | Kunz-Vizenetz | ....... 324/207.25 |
| 2005/0253578 A1 | * | 11/2005 | Kawashima et al. | ... 324/207.25 |

FOREIGN PATENT DOCUMENTS

| JP | 358159653 A | * | 9/1983 |
|---|---|---|---|
| JP | 2003-75108 | | 3/2003 |

* cited by examiner

Primary Examiner—Reena Aurora
Assistant Examiner—Kenneth J Whittington
(74) Attorney, Agent, or Firm—Nixon & Vanderhye PC

(57) ABSTRACT

An improved rotation angle detecting device that detects a rotation angle of a first member relative to a second member is proposed. The rotation angle detecting device includes a magnet unit fixed to the first member and a pair of magnetic sensors fixed to the second member to provide output signals whose phase is different from each other at 90 degrees in angle. The magnet unit includes a pair of disk plates that has the same magnetic poles at the same circumferential positions and is disposed at a prescribed axial distance and a shaft that is made of magnetic material to support the disk plates at the center thereof. The magnetic unit provides a uniform magnetic field in a space around the shaft between the pair of disk plates, and a pair of magnetic sensors is disposed in the space.

19 Claims, 7 Drawing Sheets

ROTATION ANGLE DETECTING DEVICE

CROSS REFERENCE TO RELATED APPLICATION

The present application is based on and claims priority from Japanese Patent Application 2004-231636, filed Aug. 6, 2004, the contents of which are incorporated herein by reference.

BACKGROUND OF THE INVENTION

1. Field of the Invention

The present invention relates to a rotation angle detecting device for detecting a relative rotation angle between two members without contacting the members.

2. Description of the Related Art

JP-A-2003-75108 discloses a rotation angle detecting device that detects a relative rotation angle of one member to another member by means of a permanent magnet and a pair of magnetic sensors. The pair of magnetic sensors is fixed to the one member to be spaced apart from the other at 90 degrees in angle and disposed to confront the permanent magnet that is fixed to the other. Therefore, magnetic sensors are disposed near the permanent magnet, which forms an open magnetic field. That is, the lines of magnetic flux in the open magnetic field radially but unevenly spread from the peripheral edge of the permanent magnet. Accordingly, the output signal of the magnetic sensor may vary if the position of the magnetic sensor is shifted, resulting in a detection error of the rotation angle.

SUMMARY OF THE INVENTION

Therefore, it is an object of the invention to provide an improved rotation angle detecting device that is free from the above described inconvenience.

According to a feature of the invention, a rotation angle detecting device for detecting a relative rotation of two members includes a magnet unit fixed to the first member and a pair of magnetic sensors fixed to the second member to provide output signals whose phase is different from each other at 90 degrees in angle. In the above device, the magnet unit includes a pair of disk plates that has the same magnetic poles at the same circumferential positions and is disposed at a prescribed axial distance and a shaft that is made of magnetic material to support the disk plates at the center thereof. Therefore, the magnetic unit provides a uniform magnetic field in a space around the shaft between the pair of disk plates, in which the pair of magnetic sensors is disposed. Accordingly, errors in the detected rotation angle can be substantially eliminated even if there is variations in position of the magnetic sensors so that output variations of the magnetic sensor to the detected rotation angle can be substantially eliminated In the above rotation angle detecting device, each of the pair of magnetic sensors is preferably disposed at the middle of both axial and radial directions in the space. Each of the magnetic sensors may have a sensor surface that faces toward an axis of rotation. The pair of magnetic sensors may be disposed in a chip so that one of the magnetic sensor has a first sensor surface that faces toward an axis of rotation and the other magnetic sensor may have a second sensor surface that faces in a direction perpendicular to the first sensor surface. The above rotation angle detecting device may include means for equalizing peak values of the output signals of the pair of magnetic sensors, such as means for inclining one of the magnetic sensors.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

A rotation angle detecting device according to the first embodiment of the invention will be described with reference to FIGS. 1-5 of the appended drawings.

Figure 4:
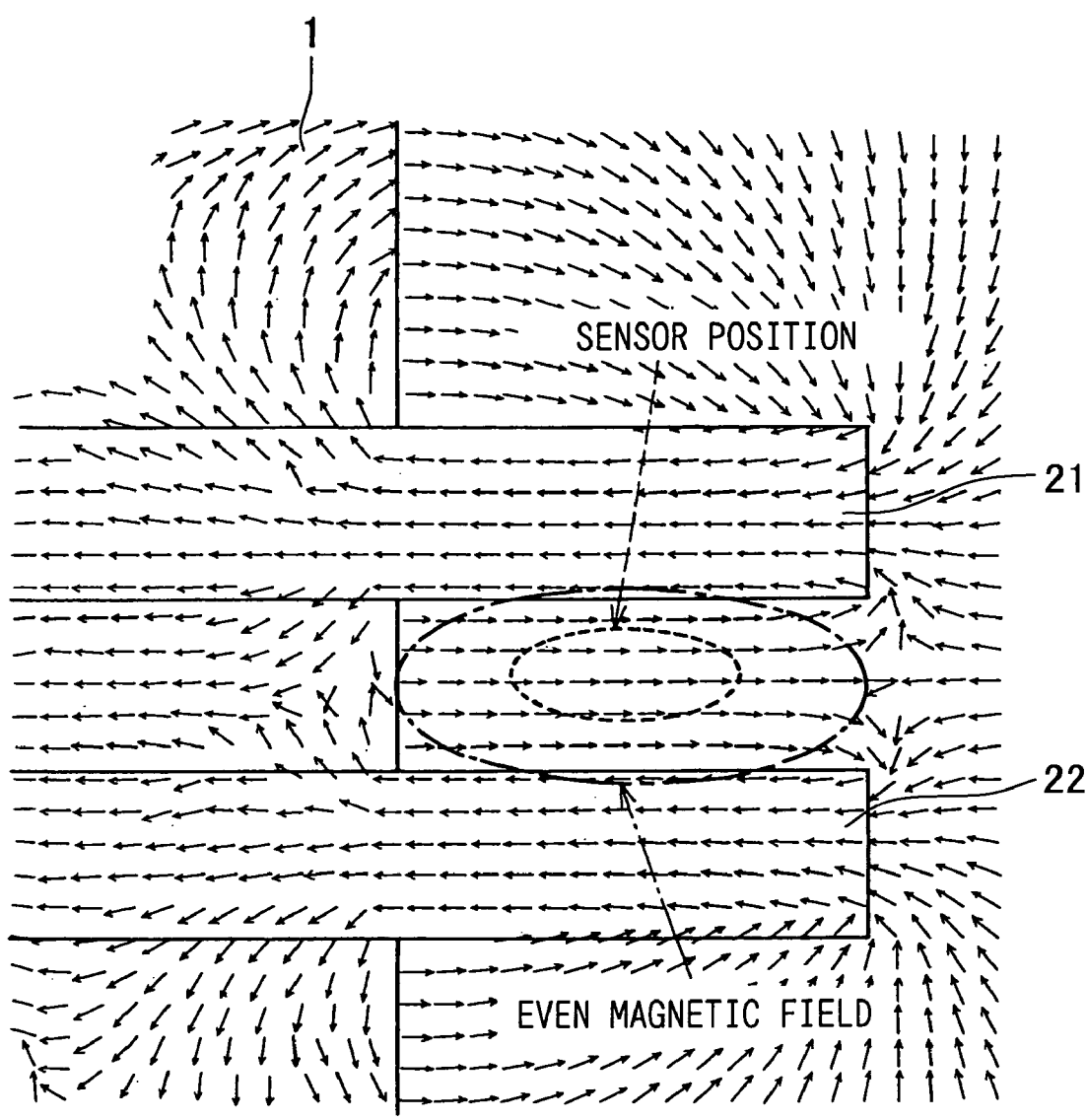
FIG. 4 illustrates lines of magnetic flux at the rotation angle detecting device according to the first embodiment.

The rotation angle detecting device includes a shaft 1, a permanent magnet unit 2, a pair of magnetic sensors 3, 4 and an angle processing unit 5. The shaft 1 is a pole member made of a magnetic material such as iron and is connected to an outside member such as a rotating shaft of a throttle valve. The permanent magnet unit 2 is constituted of a pair of magnet disks 21, 22, which are supported by the shaft 1 at a certain distance in the axial direction to rotate together therewith. The magnet disks 21, 22 have an axis Z and a pair of radially magnetized magnetic poles N, S at opposite positions (at an interval of 180 degrees) on its periphery. The magnet disks 21, 22 are the same both in size and magnetic characteristics. Accordingly, a closed magnetic field is formed in the space around the shaft 1 between the magnet disks 21, 22, as shown in FIG. 4, in which: arrows indicate lines of magnetic force of the permanent disks 21, 22; a one-dot-chain-line circle indicates a diametrically oriented uniform magnetic field or vector; and a broken-line circle indicates an axial area in which the magnetic sensor 3 or 4 is located.

Figure 1A:
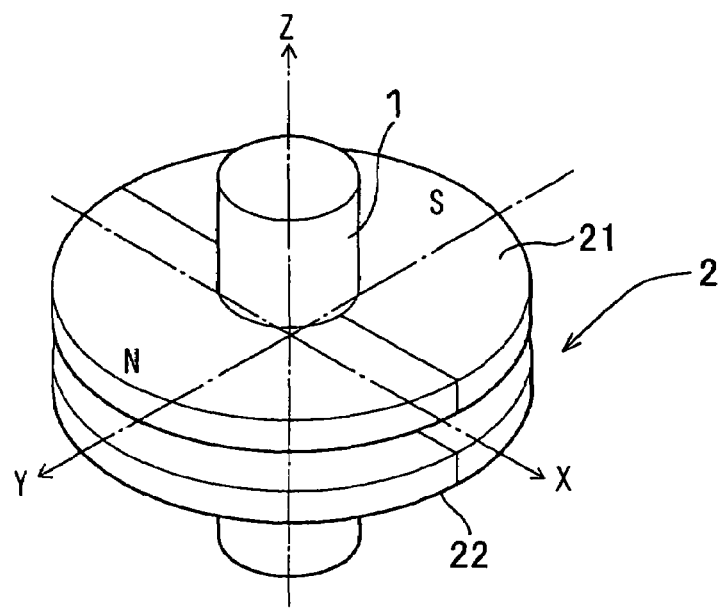
FIG. 1A is a perspective front view.
Figure 1B:
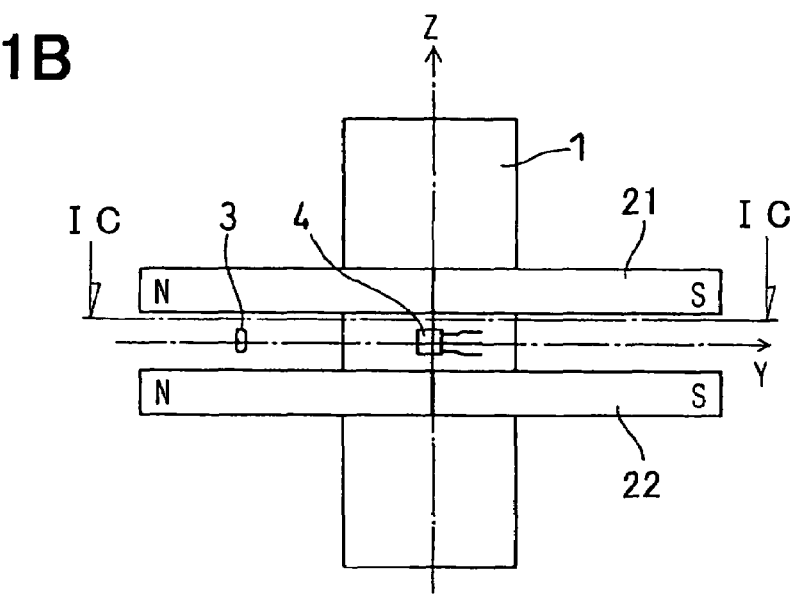
FIG. 1B is a side view.
Figure 1C:
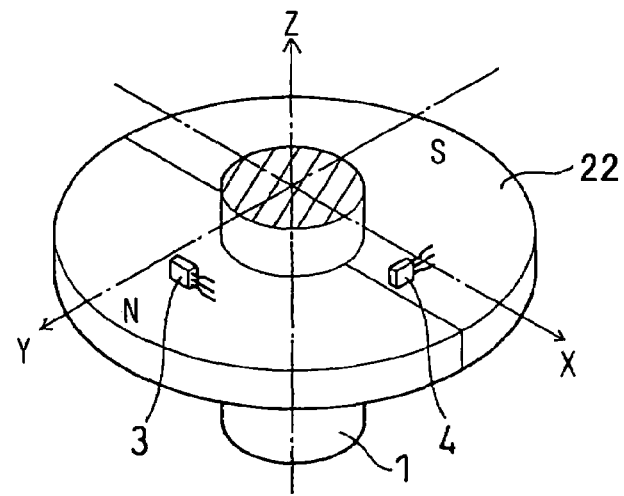
FIG. 1C is a partially cross-sectional perspective view cut along line IC-IC in FIG. 1B, which illustrate a rotation angle detecting device according to the first embodiment of the invention.
Figure 2:
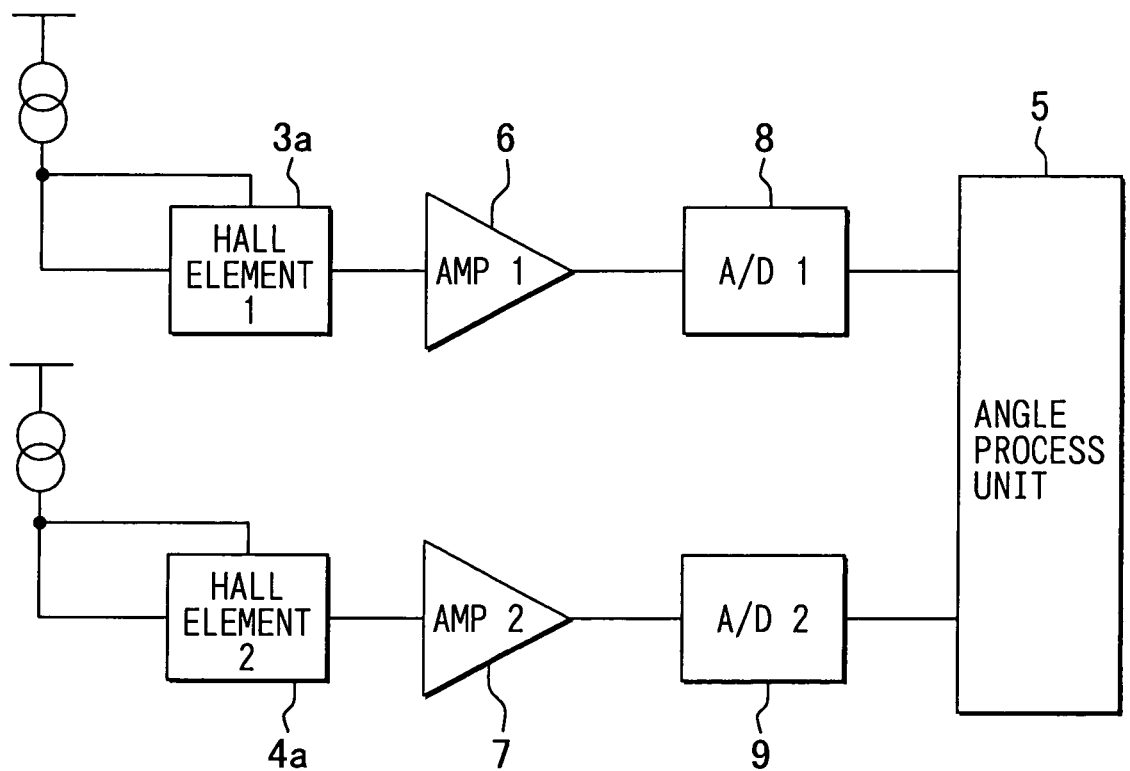
FIG. 2 is a electric block diagram of the rotation angle detecting device according to the first embodiment.
Figure 5A:
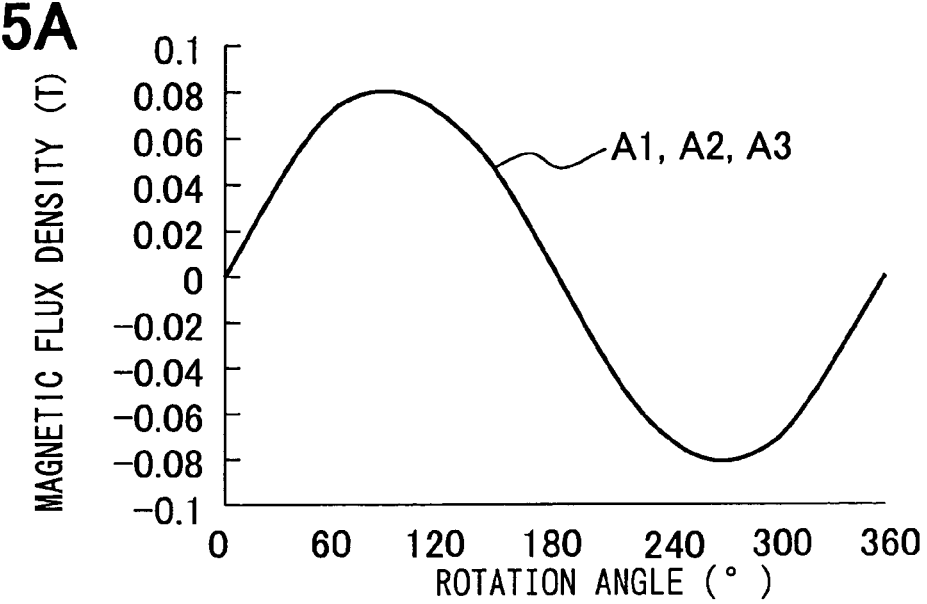
FIGS. 5A and 5B are graphs showing changes in magnetic flux density detected by the magnetic sensors of the rotation angle detecting device according to the first embodiment.

The first magnetic sensor 3 is disposed in the broken-line circle between the magnet disks 21, 22 and fixed to a stationary member such as a housing or a printed circuit board. The first magnetic sensor 3 includes a hall element that generates an output signal according to the direction and the density of magnetic flux that passes through the sensor surface of the magnetic sensor 3. Therefore, the output signal does not change even if the location of the first magnetic sensor 3 is slightly shifted, as shown in FIG. 5A, in which: A1 indicates an output signal of the first magnetic sensor 3 that is positioned correctly; A2 indicates an output signal of the first magnetic sensor 3 that is shifted by 1 mm in Y direction in FIG. 1C; and A3 indicates an output signal of the first magnetic sensor 3 that is shifted by 1 mm in Z direction in FIG. 1B. The output signal of the first magnetic sensor 3 is amplified by a first amplifier 6, as shown in FIG. 2. The first amplifier 6 is integrated into the first magnetic sensor 3. However it may be separately disposed on a printed circuit board.

Figure 3A:
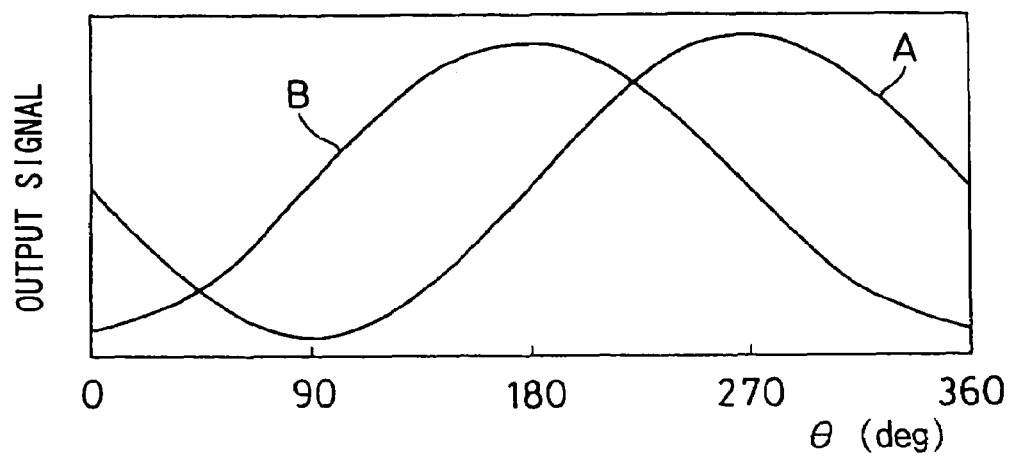
FIG. 3A is a graph showing an output signal of a pair of magnetic sensors of the rotation angle detecting device according to the first embodiment.
Figure 3B:
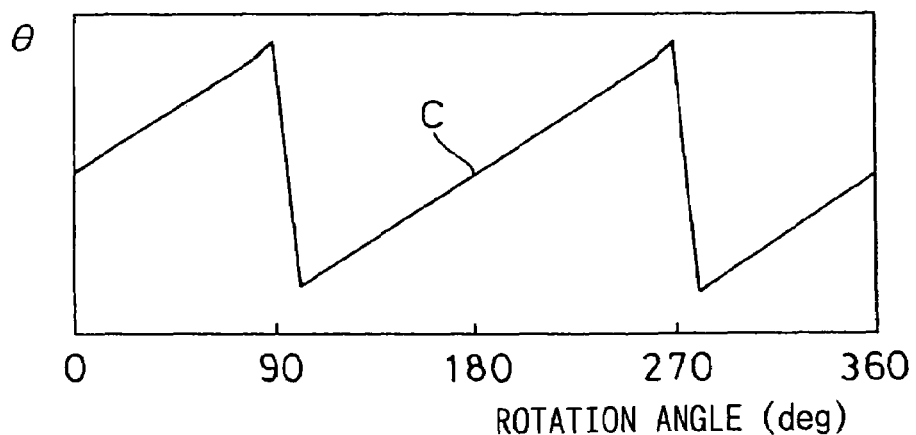
FIG. 3B and FIG. 3C are graph showing operational calculations for providing a rotation angle.
Figure 3C:
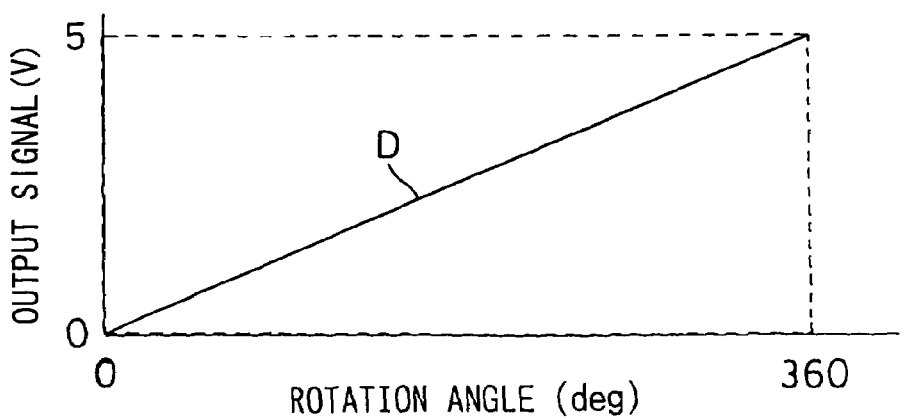

Each of the first and second magnetic sensors 3, 4 has a sensor surface formed perpendicular to the Z axis. The second magnetic sensor 4 is disposed at a position 90 degrees in angle shifted from the first magnetic sensor 3 in the circumferential or rotation direction so as to detect the magnetic flux density at a position 90 degrees shifted from the magnetic flux density detected by the first magnetic sensor 3, as shown in FIG. 3A, in which curve A (sine curve) corresponds to the output signal of the first magnetic sensor 3, and curve B (cosine curve) corresponds to the output signal of the second magnetic sensor 4.

Figure 5B:
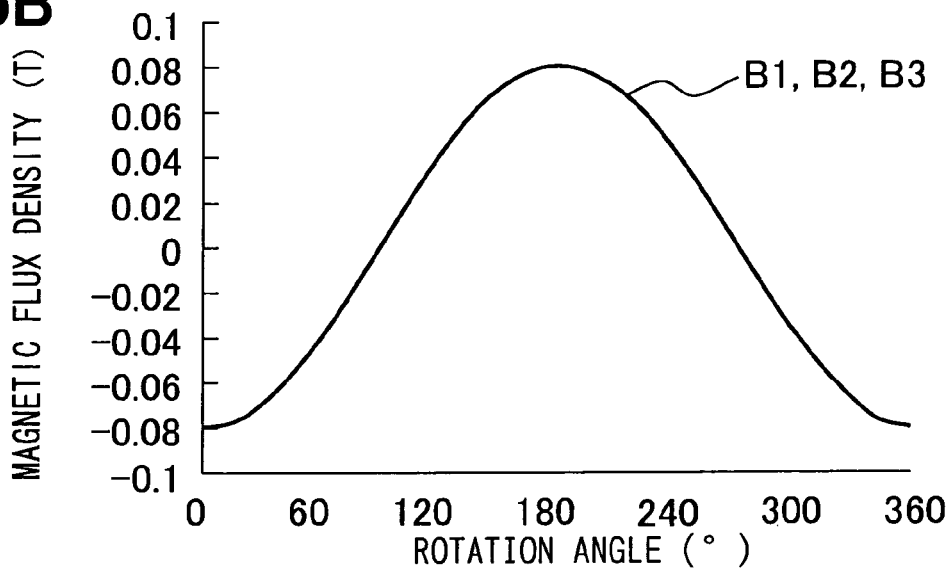

The second magnetic sensor 4 is also disposed in the broken-line circle between the magnet disks 21, 22 and fixed to the same stationary member. The second magnetic sensor 4 includes the same type of the hall element as the first magnetic sensor 3 that generates an output signal according to the direction and the density of magnetic flux that passes through the sensor surface of the second magnetic sensor 4. Therefore, the output signal does not change even if the location of the second magnetic sensor 4 is slightly shifted, as shown in FIG. 5B, in which: B1 indicates an output signal of the second magnetic sensor 4 that is positioned correctly; B2 indicates an output signal of the second magnetic sensor 4 that is shifted by 1 mm in Y direction in FIG. 1C; and B3 indicates an output signal of the second magnetic sensor 4 that is shifted by 1 mm in Z direction in FIG. 1B. The output signal of the second magnetic sensor 4 is also amplified by a second amplifier 7, as shown in FIG. 2. The second amplifier 7 is also integrated into the second magnetic sensor 4, although it may be separately formed on a printed circuit board.

Figure 5C:
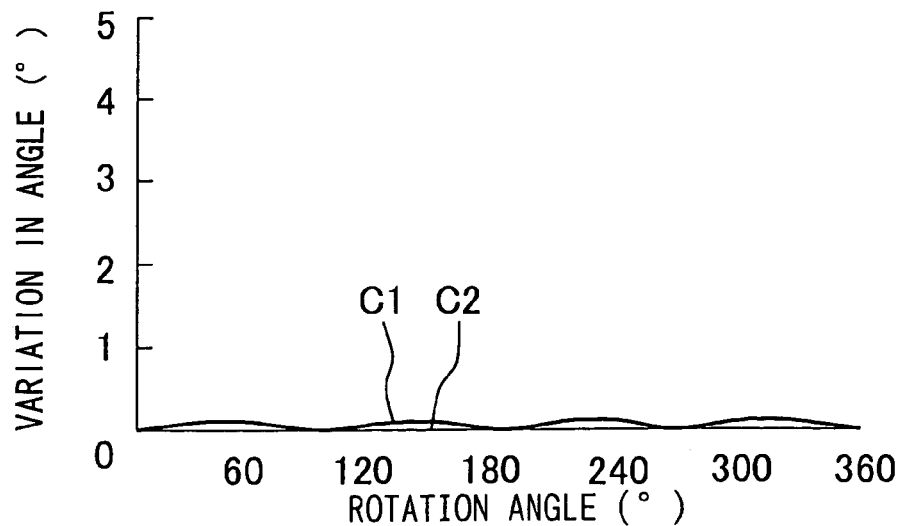
FIG. 5C is a graph showing variations in rotation angle detected by the magnetic sensors.

The angle processing unit 5 includes a common microcomputer, which takes in signals from first and second A/D converters 8, 9 that respectively convert the output signals of the first and second magnetic sensor 3 into digital signals, as shown in FIG. 2. The angle processing unit 5 calculates an arctangent curve C ($\theta=\tan^{-1}(\sin\theta/\cos\theta)$) having a 180-degree cycle from the curves A, B and provides a curve D having a 360-degree cycle by connecting the upslope portions of the curve C. Because the first and second magnetic sensors 3, 4 are located in the uniform magnetic field as described above, errors in the detected rotation angle can be substantially eliminated, as shown in FIG. 5C, in which: C1 indicates an error when the first or second magnetic sensor 3, 4 is shifted in the Y direction from the normal position by 1 mm; and C1 indicates an error when the first or second magnetic sensor 3, 4 is shifted in the Z direction from the normal position by 1 mm.

A rotation angle detecting device according to the second embodiment of the invention will be described with reference to FIGS. 6A-7C. Incidentally, the same reference numeral indicates the same or substantially the same part, component or portion as the first embodiment.

Figure 6A:
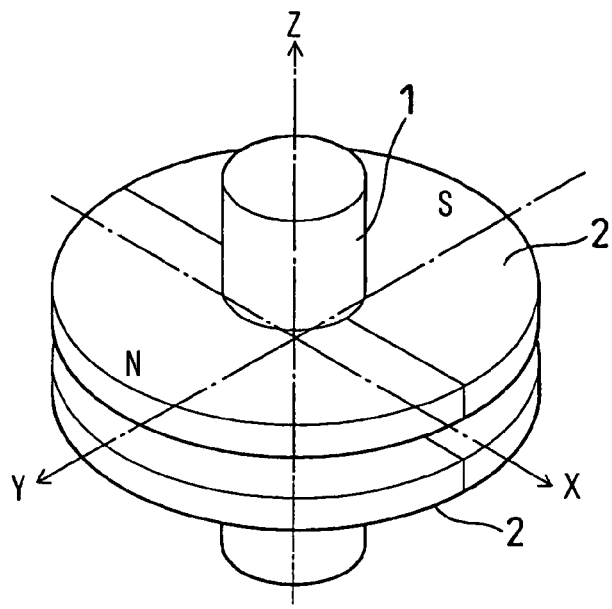
FIG. 6A is a perspective front view.
Figure 6B:
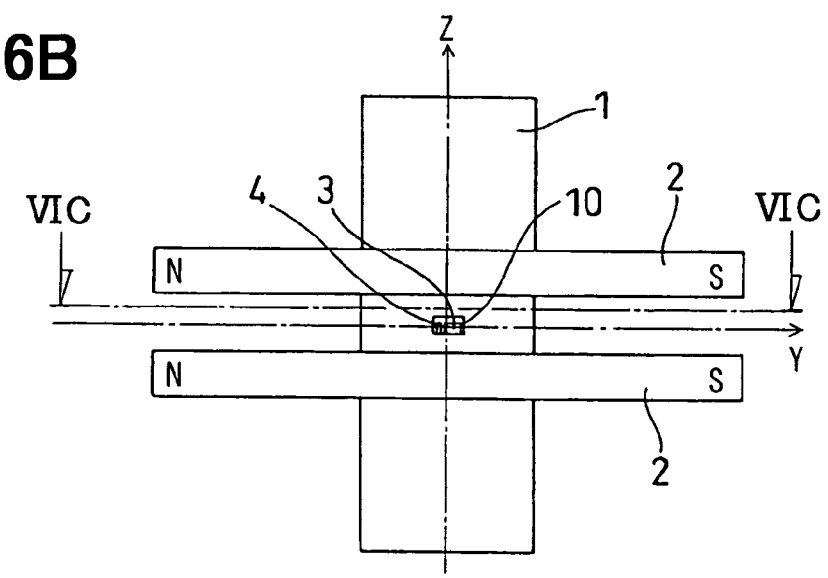
FIG. 6B is a side view.
Figure 6C:
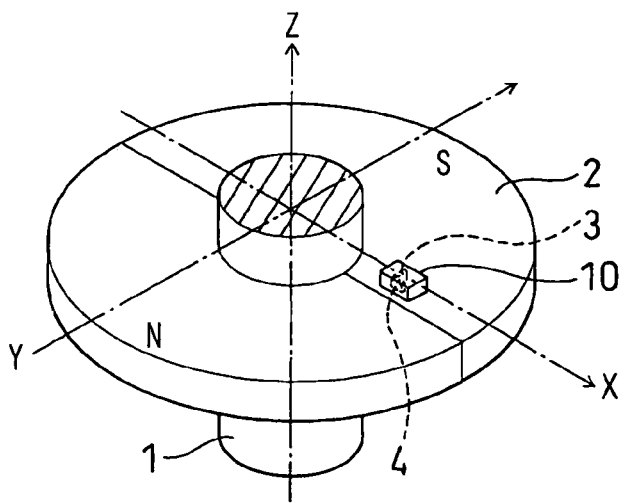
FIG. 6C is a partially cross-sectional perspective view cut along line VIC-VIC in FIG. 6B, which respectively illustrate a rotation angle detecting device according to the second embodiment of the invention.

The rotation angle detecting device includes a pair of magnetic sensors 3, 4 that is disposed together in a chip 10 in such that the sensor surface of the second magnetic sensor 4 is perpendicular to the sensor surface of the first magnetic sensor 3. That is, the output signal of the second magnetic sensor 4 is shifted by about 90 degrees from the output signal of the first magnetic sensor 3. As shown in FIG. 6C, the sensor surface of the first magnetic sensor 3 faces toward the Z axis. Accordingly, the first and second magnetic sensor 3, 4 respectively generate sine-curve output signal, and cosine-curve output signal.

The angle processing unit 5 takes in the output signals from first and second A/D converters 8, 9 that respectively convert the output signals of the first and second magnetic sensor 3 into digital signals, thereby providing a curve having a 360-degree in the same manner as described in the description of the first embodiment.

Figure 7A:
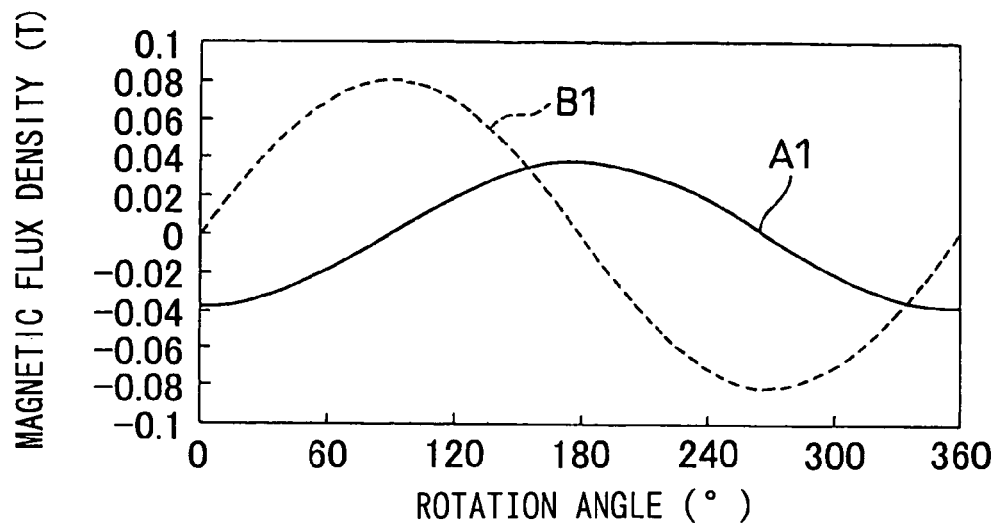
FIG. 7A is a graph showing output signals of magnetic sensors of the rotation detecting device according to the second embodiment before adjustment.
Figure 7B:
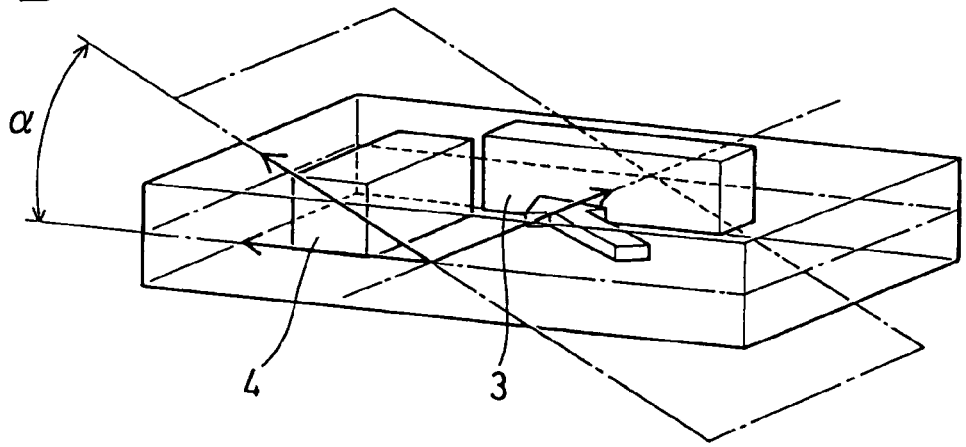
FIG. 7B illustrates a step of adjustment and FIG. 7C is a graph showing the output signals of the magnetic sensors after adjustment.
Figure 7C:
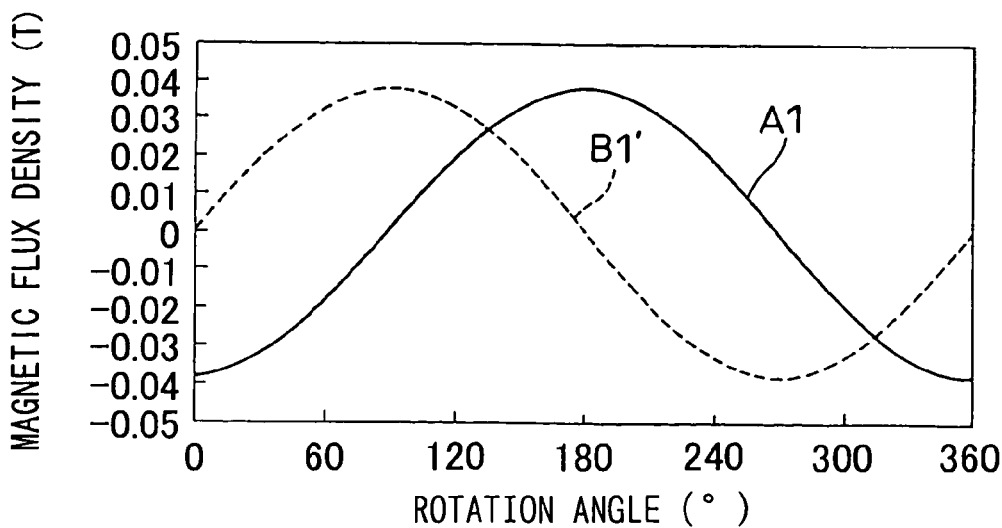

In order to reduce errors in the output signals, the difference in the sensitivity or in the peak value of the output signal between the magnetic sensor 3 and the magnetic sensor 4 should be minimized. If the peak value A1 of the output signal of the magnetic sensors 3 caused to be lower than the peak value B1 of the second magnetic sensor 4 by the shaft 1 that is made of magnetic material as shown in FIG. 7A, the difference can be eliminated by inclining the chip 10 so that the sensor surface of the second magnetic sensor 4 inclines to the magnetic field by an angle α as shown in FIG. 7B. The inclination angle α can be calculated by the following expression: $\alpha=\cos^{-1}(V1/V2)$, wherein: V1 is a peak value of the output signal of the first magnetic sensor 3; and V2 is a peak value of the output signal of the second magnetic sensor 4. Thus, the difference in the peak value between the first magnetic sensor 3 and the second magnetic sensor 4 can be eliminated, as shown in FIG. 7C.

The difference may be eliminated or reduced by changing the gain of the first or second amplifier 6, 7, or adjusted by the angle processing unit 5. Because the first and second magnetic sensors 3, 4 are formed in a chip, the assembling work becomes simpler. In addition, it is easy to adjust performance of the magnetic sensors because they are in the same ambient conditions, such as temperature, humidity and vibration.

In the above described embodiments, it is possible to rotate the magnetic sensors 3, 4 instead of the magnet disks 21, 22. It is also possible to employ a magneto-resistance element for the magnetic sensor instead of the hall element. The magnet disk may be replaced with a electromagnetic disk having a magnetic coil.

The rotation angle sensor according to the invention may be used for other devices than the throttle valve sensor, such as a crankshaft position sensor or a robot arm position sensor.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A rotation angle detecting device for detecting a rotation angle of a first member relative to a second member, said rotation angle detecting device comprising a magnet unit fixed to the first member and a pair of magnetic sensors fixed to the second member to provide output signals whose phase is different from each other at 90 degrees in angle, wherein:

said magnet unit comprises a pair of radially magnetized disk plates that have the same magnetic poles at the same peripheral positions of said disk plates and are disposed at a prescribed axial distance and a shaft that is made of magnetic material to support said disk plates at their centers, wherein said magnetic unit provides a space defined by said shaft and said pair of disk plates and lines of magnetic force in said space are oriented predominantly in parallel with said disk plates; and said pair of magnetic sensors is disposed in said space, between said disk plates.

2. The rotation angle detecting device as claimed in claim 1, each of said pair of magnetic sensors is disposed at the middle of both axial and radial directions in said space.

3. The rotation angle detecting device as claimed in claim 1, wherein each of said magnetic sensors has a sensor surface that faces toward an axis of rotation.

4. The rotation angle detecting device as claimed in claim 1, wherein said pair of magnetic sensors is disposed in a chip so that one of said magnetic sensor has a first sensor surface that faces toward an axis of rotation and the other magnetic sensor has a second sensor surface that faces in a direction perpendicular to the first sensor surface.

5. The rotation angle detecting device as claimed in claim 4 further comprising means for equalizing peak values of the output signals of said pair of magnetic sensors.

6. The rotation angle detecting device as claimed in claim 5, wherein said means comprises means for inclining one of said pair of magnetic sensors.

7. The rotation angle detecting device as claimed in claim 1, wherein each of the disk plates comprises a permanent magnet that is magnetized in a diametrical direction to have opposite magnetic poles.

8. A rotation angle detecting device for detecting a rotation angle of a first member relative to a second member, said rotation angle detecting device comprising a magnet unit fixed to the first member and a pair of magnetic sensors fixed to the second member to provide output signals whose phase is different from each other at 90 degrees in angle, wherein:

said magnet unit comprises a pair of radially magnetized disk plates that have the same magnetic poles at the same peripheral positions of said disk plates and are disposed at a prescribed axial distance and a shaft that is made of magnetic material to support said disk plates at their centers, wherein said magnetic unit provides a space around said shaft between said pair of disk plates and lines of magnetic force in said space are oriented substantially in parallel with said disk plates; and said pair of magnetic sensors is disposed in said space, each of said pair of magnetic sensors is disposed at the middle of both axial and radial directions in said space.

9. The rotation angle detecting device as claimed in claim 8, wherein each of said magnetic sensors has a sensor surface that faces toward an axis of rotation.

10. The rotation angle detecting device as claimed in claim 8, wherein said pair of magnetic sensors is disposed in a chip so that one of said magnetic sensor has a first sensor surface that faces toward an axis of rotation and the other magnetic sensor has a second sensor surface that faces in a direction perpendicular to the first sensor surface.

11. The rotation angle detecting device as claimed in claim 10 further comprising means for equalizing peak values of the output signals of said pair of magnetic sensors.

12. The rotation angle detecting device as claimed in claim 11, wherein said means comprises means for inclining one of said pair of magnetic sensors.

13. The rotation angle detecting device as claimed in claim 8, wherein each of pair of disk plates comprises a permanent magnet that is magnetized in a diametrical direction to have opposite magnetic poles.

14. A rotation angle detecting device for detecting a rotation angle of a first member relative to a second member, said rotation angle detecting device comprising a magnet unit fixed to the first member and a pair of magnetic sensors fixed to the second member to provide output signals whose phase is different from each other at 90 degrees in angle, wherein:

said magnet unit comprises a pair of radially magnetized disk plates that have the same magnetic poles at the same peripheral positions of said disk plates and are disposed at a prescribed axial distance and a shaft that is made of magnetic material to support said disk plates at their centers, wherein said magnetic unit provides a space defined by said shaft and said pair of disk plates and lines of magnetic force in said space are oriented substantially in parallel with said disk plates; and said pair of magnetic sensors is disposed in said space, between said disk plates, wherein each of the disk plates comprises a permanent magnet that is magnetized solely in a diametrical direction to have opposite magnetic poles.

15. The rotation angle detecting device as claimed in claim 14, each of said pair of magnetic sensors is disposed at the middle of both axial and radial directions in said space.

16. The rotation angle detecting device as claimed in claim 14, wherein each of said magnetic sensors has a sensor surface that faces toward an axis of rotation.

17. The rotation angle detecting device as claimed in claim 14, wherein said pair of magnetic sensors is disposed in a chip so that one of said magnetic sensor has a first sensor surface that faces toward an axis of rotation and the other magnetic sensor has a second sensor surface that faces in a direction perpendicular to the first sensor surface.

18. The rotation angle detecting device as claimed in claim 17, further comprising means for equalizing peak values of the output signals of said pair of magnetic sensors.

19. The rotation angle detecting device as claimed in claim 18, wherein said means comprises means for inclining one of said pair of magnetic sensors.

* * * * *